June 21, 1927.
A. M. BARRETT
LIFTING TRUCK
Filed Dec. 24, 1921
1,633,390
2 Sheets-Sheet 1
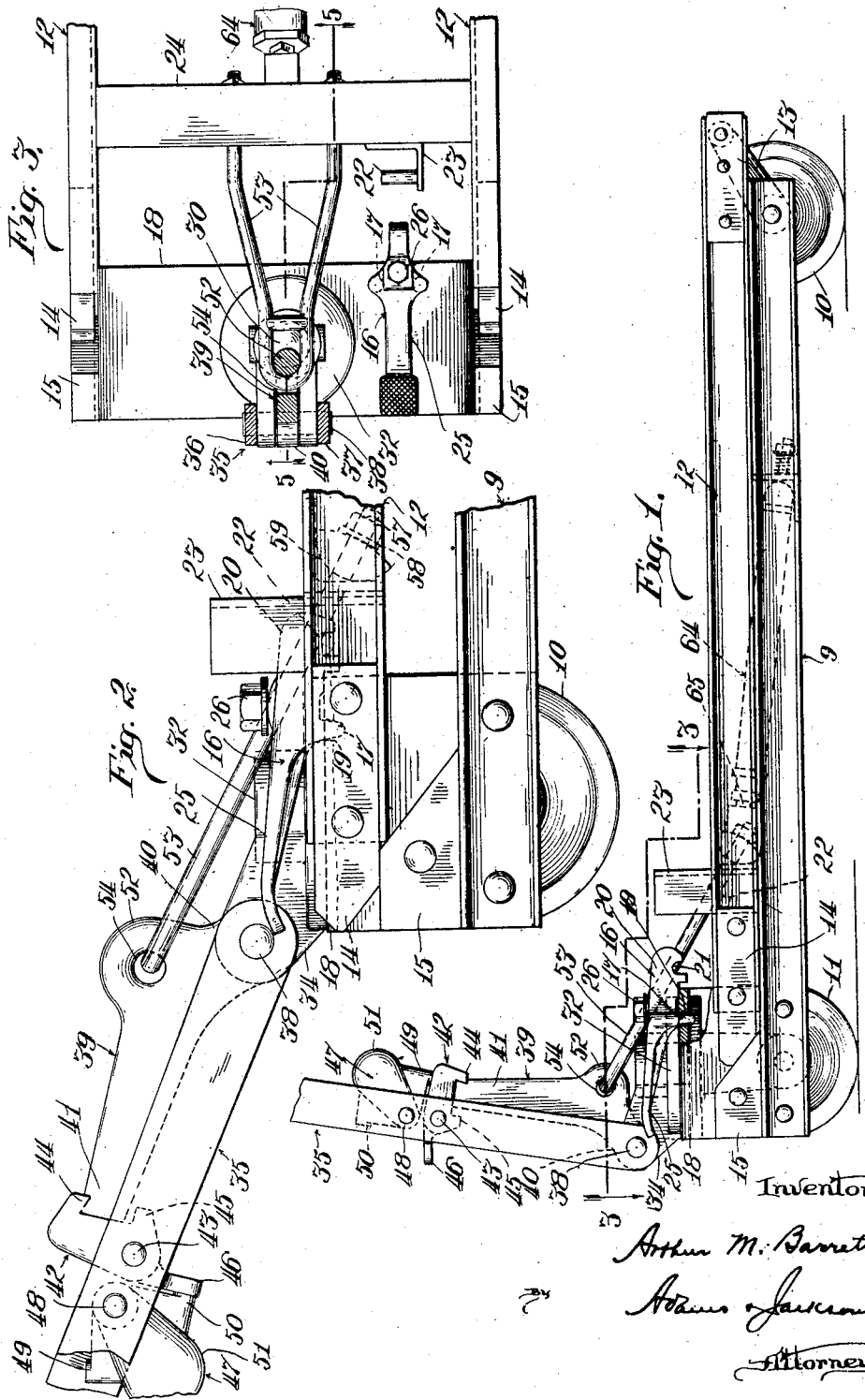

June 21, 1927.
A. M. BARRETT
LIFTING TRUCK
Filed Dec. 24, 1921
1,633,390
2 Sheets-Sheet 2
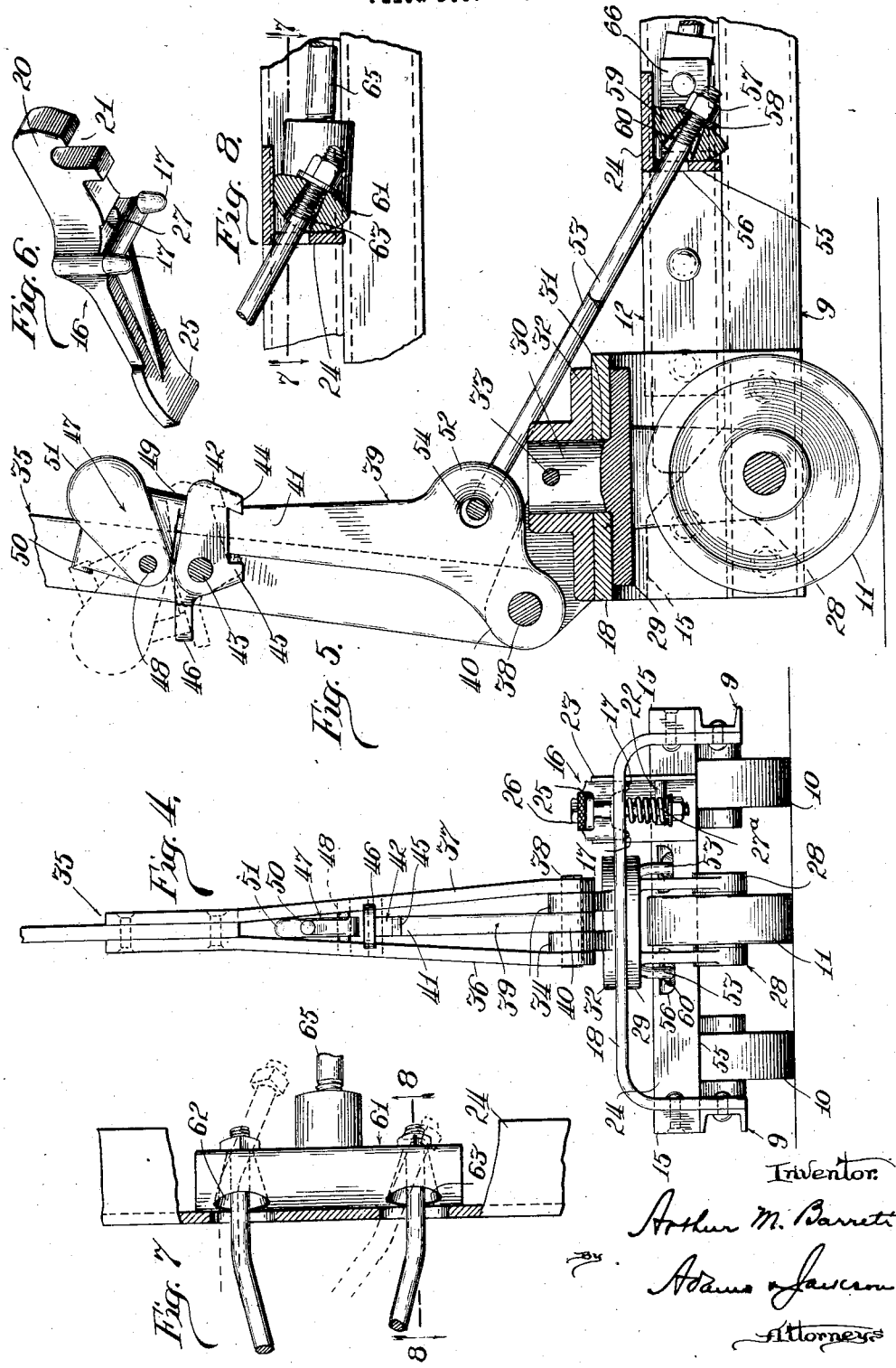
Inventor:
Arthur M. Barrett,
By Adams & Jackson
Attorneys Patented June 21, 1927.

1,633,390

UNITED STATES PATENT OFFICE.

ARTHUR M. BARRETT, OF WINNETKA, ILLINOIS.

LIFTING TRUCK.

Application filed December 24, 1921. Serial No. 524,628.

My invention relates to lifting trucks of the well-known type in which the elevating frame or platform is raised by means of a steering handle or lever which is capable of being swung laterally to some extent without interfering with its use for lifting the platform. It has for its object to provide certain improvements by which the construction and operation of lifting trucks of this type may be simplified and the cost of manufacture reduced. I accomplish this object as illustrated in the drawings and hereinafter described. What I regard as new is set forth in the claims.

In the accompanying drawings,—

Fig. 1 is a side elevation of my improved truck, the platform being in its lowered position and the lifting handle in position to elevate the platform;

Fig. 2 is an enlarged fragmentary side view of the forward portion of the truck showing the position of the parts at the conclusion of the lifting operation;

Fig. 3 is an enlarged horizontal section on line 3—3 of Fig. 1;

Fig. 4 is a front elevation of the truck showing the same position of the parts as is illustrated in Fig. 1;

Fig. 5 is a partial longitudinal vertical section taken on line 5—5 of Fig. 3;

Fig. 6 is a perspective view of the latch which holds the platform in its elevated position;

Fig. 7 is a partial horizontal section on line 7—7 of Fig. 8 showing a modification; and Fig. 8 is a partial vertical section on line 8—8 of Fig. 7.

Referring to the drawings, 9 indicates the main frame which is of the usual construction and is mounted on rear wheels 10 and a front or steering wheel 11. I have illustrated a single steering wheel, but obviously two front wheels may be provided if desired. 12 indicates the elevating frame or platform which is also of the usual construction and is preferably mounted at the rear on swinging links 13 pivotally connected with the main frame and platform. The front end of the platform is provided with forwardly-extending bevelled plates 14 which engage inclined blocks 15 at the forward end portions of the main frame 9, as shown in Fig. 1, so that by drawing the platform forward it will rise until it ultimately assumes the position shown in Fig. 2, the plates 14 then resting on the blocks 15. By moving the platform rearwardly it will, of course, descend until it rests on the main frame. For holding the platform in its elevated position I provide a latch 16, having the construction shown in Fig. 6. Said latch is in the form of a lever having midway on its under side downwardly extended rounded projections 17 which are adapted to fit in sockets provided to receive them in a cross-head 18 which is rigidly connected to the forward end portions of the side members of the main frame, as shown in Fig. 3. The position of these sockets is shown at 19 in Fig. 2. The rearwardly-extending arm 20 of the latch 16 is provided at its under side with a recess 21 which is adapted to hook over a pin 22 carried by a bracket 23 which is secured to a cross-bar 24 forming a part of the platform, as shown in Fig. 3. The forwardly-extending arm 25 of the latch 16 forms a foot lever by depressing which the pin 22 may be released from engagement with the socket in the recess 21, thereby permitting the platform to be moved rearwardly to lower it. The latch 16 is held in position by a bolt 26 which passes vertically through a hole 27 in said latch adjacent to and back of the projections 17, as shown in Fig. 6. The bolt 26 also passes through the cross-head 18 and at the under side of said cross-head is provided with a spring 27ª which pulls down on the bolt 26 and thereby tends to hold the arm 20 yieldingly in position to engage the pin 22.

The steering wheel 11 is mounted in a yoke 28—28 depending from the steering head 29, which is provided with an upright pivot 30 fitted in a bearing 31 in the cross-head 18, as shown in Figs. 4 and 5, and above said cross-head the pivot 30 is provided with a circular plate 32 which is connected therewith by a pin 33, as shown in Fig. 5. This plate 32 is provided with upwardly and forwardly extending lugs 34 which form a yoke to which the steering lever is pivotally connected. As shown in Fig. 4, in which 35 indicates the steering handle as a whole, the lower portion of said steering handle comprises two members 36, 37 spaced apart so that their lower ends are adapted to fit against the outer faces of the lugs 34, and said members 36, 37 are pivotally connected to said lugs by a pivot pin 38. By this construction the steering handle is connected with the steering head so that by swinging it laterally the steering wheel may be turned in one direction or the other to steer the truck, and may also be employed to push or pull the truck.

Mounted between the members 36, 37 of the steering handle is a lifting lever 39 the shape of which is best shown in Fig. 5. As therein shown, said lever is of bell-crank shape, the lowermost arm 40 thereof being mounted on the pivot 38 between the lugs 34, as shown in Fig. 4. The upper arm 41 of said lifting lever extends between the members 36, 37 and is adapted to be connected with the steering handle 35 by means of a latch 42 pivotally mounted between the upper portions of the members 36, 37 by a pivot 43, as shown in Figs. 4 and 5. The latch 42 is provided with a hook 44 which is adapted to engage the upper end of the arm 41, the latter preferably being undercut, as shown in Fig. 5, to secure a more positive engagement of the hook 44 therewith. The latch 42 is also provided with a heel 45 which depends in front of the upper end of the lever 39, and with an arm 46 which extends forward of the pivot 43 so that by depressing said arm the hook 44 may be disengaged from the lever 39. The function of the heel 45 is to prevent the steering handle from swinging back beyond an approximately upright position, so that it may be held up in such position when the truck is not in use, or may be used in pushing the truck. Sufficient space is left between the hook 44 and the heel 45 to permit the hook to be moved out of engagement with the lever 39 by pressing down on the arm 46. Backward pressure on the steering handle when it stands upright causes the heel 45 to bear against the upper end of the lever 39 and consequently further backward movement of the handle is prevented. Obviously, when the lever 39 is locked to the steering handle 35 by means of the latch 42, said lever moves in unison with the steering handle, but by disengaging the latch 42 from the lever 39 the steering handle may be raised or lowered without affecting said lever, although the lever 39 will swing with the steering handle if the latter be swung laterally. It will be apparent, therefore, that regardless of the lateral position of the steering handle within its range of movement, it may always be brought into position to connect it with the lever 39 by simply swinging it to an upright position as shown in Fig. 5.

The latch 42 is normally held in its inoperative position with regard to the lever 39 by means of a swinging tappet 47, the construction and arrangement of which are shown in Fig. 5. This tappet comprises a substantially square block pivoted adjacent to one corner on a pivot 48 secured between the members 36—37 of the steering handle immediately above the pivot 43. One of the corners, 49, of said member is adapted to engage the upper edge of the latch 42 at the rear of the pivot 43, while another corner, 50, thereof is adapted to engage the arm 46 of said latch when the tappet is swung forward into the position shown by dotted lines in Fig. 5. The intermediate portion of the tappet is enlarged and made comparatively heavy as shown at 51 to form a counterbalance weight which will tend to rock the tappet about its pivot 48 when the steering handle is swung down to the position shown in Fig. 2. As shown in the latter figure, when the steering handle is moved to this position gravity will cause the tappet to swing down until the part 50 engages the arm 46, but this will not immediately release the latch 42 from the lever 39 because, as will hereinafter appear, the weight of the load will tend to pull the upper end of the lever 39 rearwardly and so will hold the said arm in engagement with the latch 42 during the lifting operation. When, however, the platform has been raised to its highest position, if the steering handle be slightly lifted the weight of the tappet will suffice to disengage the hook 44 from the lever 39, and the latch 42 will then remain in its inoperative position even though the steering handle be turned to its upright position. When the operator wishes to again operatively connect the lever 39 with the steering handle he manually swings the tappet 47 over to the right as viewed in Fig. 5 so that it assumes the position shown in full lines in said figure, thereby again moving the latch 42 into engagement with the lever 39.

The intermediate portion 52 of the lever 39 is connected to the forward end portion of the platform by means of a draft member preferably in the form of a yoke 53, the forward or closed end of which is looped loosely through an eye 54 formed in said arm, as shown in Figs. 2 and 5. The rear or separated ends of said yoke, which is preferably in the form of a bent rod, are connected with the cross-bar 24, which is preferably in the form of an angle bar, and extends through the vertical web 55 thereof which is provided with comparatively large holes 56 so that the ends of the yoke 53 extend loosely therethrough. The yoke ends are threaded and provided with nuts 57 and washers 58, as shown in Fig. 5, and between said washers and the rear face of the web 55 curved bearing blocks 59 are provided, having tapered openings 60 through which the ends of the yoke 53 pass. By this construction the yoke 53 is telescopically connected with the front end of the lifting platform so that the forward end of said yoke is free not only to swing laterally and vertically, but it may also move longitudinally with reference to the platform as may be necessary to enable it to accommodate itself to the different positions of the steering handle and the lever 39. Instead of providing separate bearing blocks 59, as shown in Fig. 5, the construction shown in Figs. 7 and 8 may be employed, the difference between the two constructions being that instead of the separate blocks 59 I provide a single elongated bearing block 61 having two passages 62, 63 to receive the ends of the yoke 53. The dotted line position shown in Fig. 7 shows the manner in which the ends of the yoke adjust themselves when the steering handle is swung in the direction of the arrow shown on said figure.

As shown by dotted lines in Fig. 1, the truck is preferably provided with a fluid check 64 for cushioning the descent of the platform, the rear end of said check being connected with the main frame and the forward end thereof with the forward portion of the platform. In the construction shown in Fig. 5 the forward end of the piston rod 65 of said check is connected with the cross-bar 24 by brackets 66, whereas in the construction of Fig. 7 it is connected with the bearing block 61. Preferably, to assist in lowering the platform when it is not loaded either the check 64 is provided with a spring which tends to move the platform rearwardly or a separate spring is provided for that purpose. This spring is not shown as such springs are old in the art for that purpose.

From the foregoing description it will be understood that when the lever 39 is connected with the steering handle by means of the latch 42, if the handle be swung forward and downward the platform 12 will be drawn forward by means of the yoke 53, and consequently will swing upward to the position shown in Fig. 2 where it will be locked by the latch 16. By then slightly raising the steering handle the hook 44 will be automatically disengaged from the lever 39 so that the steering handle may be freely moved up and down independently of the lever 39 after the latter has been returned more or less to an upright position. If the lever 39 be returned to its upright position while the platform is in its elevated position the rear ends of the yoke 53 will move freely through the holes in the cross-bar 24 and the position of the platform will not be affected. If after the lifting lever 39 has been disengaged from the steering handle as above described, the steering handle be turned to its upright position for pushing the truck while the platform remains elevated, the steering handle and lifting lever will not be operatively connected by the latch 42 as the latter will be held out of operative position by the tappet 47. The steering handle may be swung laterally to steer the truck and notwithstanding the disengagement of the steering handle from the lifting lever the latter swings laterally with it so that it is always in position to be connected with said handle when the operator decides to make such connection. Such lateral swinging of the steering handle causes the yoke 53 to adjust itself with reference to the platform in the manner indicated in Fig. 7 unless the lever 39 is in its upright position, in which case the steering handle may swing laterally without changing the position of the yoke. Should the operator desire to lift a load in a congested space or narrow aisle, the handle may be swung downward and somewhat to one side at the same time, in which case the yoke 53 will adjust itself as indicated by the dotted lines in Fig. 7.

When the operator desires to lower the platform he simply depresses the arm 25 of the latch 16, thereby releasing the platform which descends by gravity owing to the fact that the links 13 are arranged so that when the platform is fully elevated they do not quite reach a vertical position, and consequently the weight of the platform and links tends to lower the platform. I wish it to be understood that while I have shown the use of inclined planes for raising the front end of the platform instead of links similar to the links 13 which are sometimes used for that purpose, my invention is not limited to the construction shown as any suitable means for causing the platform to rise when moved longitudinally may be employed.

What I claim as my invention and desire to secure by Letters Patent, is—

1. A lifting truck comprising a main frame, a steering head, a lifting platform, a steering handle pivotally connected with the steering head to swing vertically, a lifting lever also pivotally connected with said steering head to swing vertically, a rigid draft member connecting said lever and the platform, and means operable to connect or disconnect said lever and the steering handle.

2. A lifting truck comprising a main frame, a steering head, a lifting platform, a steering handle pivotally connected with the steering head to swing vertically, a lifting lever mounted to swing laterally with the steering handle, a rigid draft member connecting said lifting lever and the platform, and means operable to connect or disconnect said lever and the steering handle regardless of the steering position of said handle.

3. A lifting truck comprising a main frame, a steering head, a lifting platform, a steering handle pivotally connected with the steering head to swing vertically, a lifting lever arranged to swing laterally with the steering handle, a rigid draft member connecting said lifting lever and the platform, and means operable independently of movement of the handle to connect or disconnect said lever and the handle, regardless of the steering position of the handle.

4. A lifting truck comprising a main frame, a steering head, a lifting platform, a steering handle pivotally connected with the steering head to swing vertically, a lifting lever mounted to turn with the steering head, a rigid member connected with said lifting lever and telescopically connected with the platform, and means whereby said lever may be operatively connected with or disconnected from the steering handle.

5. A lifting truck comprising a main frame, a steering head, a lifting platform, a steering handle pivotally connected with the steering head to swing vertically, a lifting lever, a yoke loosely connected with said lifting lever and telescopically connected with the platform, and means whereby said lever may be operatively connected with or disconnected from the steering handle.

6. A lifting truck comprising a main frame, a steering head, a lifting platform, a steering handle pivotally connected with the steering head to swing vertically, a lifting lever, a rigid member connected with said lifting lever and telescopically connected with the platform, a rocking bearing between said rigid member and the platform, and means whereby said lever may be operatively connected with or disconnected from the steering handle.

7. A lifting truck comprising a main frame, a steering head, a lifting platform, a steering handle pivotally connected with the steering head to swing vertically, a lifting lever, a yoke loosely connected with said lifting lever and telescopically connected with the platform, a rocking bearing between said yoke and the platform, and means whereby said lever may be operatively connected with or disconnected from the steering handle.

8. A lifting truck comprising a main frame, a steering head, a lifting platform, a steering handle having separated members pivotally connected with the steering head to swing vertically, a lifting lever pivoted coaxially with the steering handle between the members thereof, means connecting said lifting lever with the platform, and means whereby said lever may be operatively connected with or disconnected from the steering handle.

9. A lifting truck comprising a main frame, a steering head, a lifting platform, a steering handle pivotally connected with the steering head to swing vertically, a lifting lever also pivotally connected with said steering head, means connecting said lifting lever with the platform, a draft member for connecting said lifting lever with the steering handle, and means carried by the handle and cooperating with the lifting lever to prevent rearward movement of the steering handle beyond an approximately vertical position.

10. A lifting truck comprising a main frame, a steering head, a lifting platform, a steering handle pivotally connected with the steering head to swing vertically, a lifting lever, a draft member connecting said lifting lever with the platform, and a latch for connecting said lifting lever with the steering handle, said latch having means cooperating with the lifting lever to prevent the steering handle from swinging backward beyond an approximately vertical position.

11. A lifting truck comprising a main frame, a steering head, a lifting platform, a steering handle pivotally connected with the steering head to swing vertically, a lifting lever, means connecting said lifting lever with the platform, a latch for connecting said lifting lever with the steering handle, said latch having means for preventing the steering handle from swinging backward beyond an approximately vertical position, and means pivotally mounted on the steering handle for operating said latch.

12. A lifting truck comprising a main frame, a steering head, a lifting platform, a steering handle pivotally connected with the steering head to swing vertically, a lifting lever mounted to turn with the steering head, means connecting said lifting lever with the platform, a latch for connecting said lifting lever with the steering handle, and separate means carried by the steering handle and actuated by vertical swinging thereof in one direction to disengage said latch from said lever.

13. A lifting truck comprising a main frame, a steering head, a lifting platform, a steering handle pivotally connected with the steering head to swing vertically, a lifting lever, means connecting said lifting lever with the platform, a latch for connecting said lifting lever with the steering handle, and a tappet pivotally mounted on the steering handle and operating by gravity to disconnect said latch from said lever.

14. A lifting truck comprising a main frame, a steering head, a lifting platform movable longitudinally and vertically, a steering handle connected with the steering head, means whereby the platform may be raised by the operation of said steering handle, and a latch for holding said platform in its elevated position, said latch having rounded projections on its under side upon which it is fulcrumed on said main frame, said latch comprising an arm member adapted to engage the platform when the latter is elevated and a foot lever member for actuating said latch to release the platform, and a spring for holding said latch normally in operative position.

15. A lifting truck comprising a main frame, a steering head, a lifting platform movable longitudinally and vertically, a steering handle connected with the steering head, means whereby the platform may be raised by the operation of said steering handle, and a latch for holding said platform in its elevated position, said latch having rounded projections on its under side upon which it is fulcrumed on said main frame, said latch comprising an arm member adapted to engage the platform when the latter is elevated and a foot lever member for actuating said latch to release the platform, a bolt on the main frame and extending through such latch rearwardly of the fulcrum thereof, and a spring mounted on said bolt for holding the latch normally in operative position.

ARTHUR M. BARRETT.

CERTIFICATE OF CORRECTION.

Patent No. 1,633,390.   Granted June 21, 1927, to

ARTHUR M. BARRETT.

It is hereby certified that error appears in the printed specification of the above numbered patent requiring correction as follows: Page 4, line 57, claim 9, strike out the word "means" and insert instead the words "a draft member"; and line 58, strike out the words "a draft member" and insert the word "means"; and that the said Letters Patent should be read with these corrections therein that the same may conform to the record of the case in the Patent Office.

Signed and sealed this 19th day of August, A. D. 1927.

Seal.

M. J. Moore,
Acting Commissioner of Patents.